(12) United States Patent
Arnott et al.

(10) Patent No.: US 6,340,034 B1
(45) Date of Patent: Jan. 22, 2002

(54) GAS REGULATOR WITH MULTIPLE REGULATED OUTLET PORTS

(75) Inventors: Glen M. Arnott, New Braunfels; Trevor K. Markham, San Antonio, both of TX (US)

(73) Assignee: Daniel A. Holt, San Antonio, TX (US)

( * ) Notice: Subject to any disclaimer, the term of this patent is extended or adjusted under 35 U.S.C. 154(b) by 0 days.

(21) Appl. No.: 09/501,391

(22) Filed: Feb. 9, 2000

(51) Int. Cl.[7] .......................... F16K 21/00; F16K 49/00

(52) U.S. Cl. ........................ 137/883; 137/338; 137/550

(58) Field of Search ............................... 137/338, 271, 137/269, 883, 861, 544, 550

(56) References Cited

U.S. PATENT DOCUMENTS

| | | | | |
|---|---|---|---|---|
| 3,742,977 A | * | 7/1973 | Broneske | 137/271 |
| 4,174,733 A | * | 11/1979 | Eidsmore et al. | 137/883 X |
| 4,712,578 A | * | 12/1987 | White | 137/271 |
| 5,598,869 A | * | 2/1997 | Nelson | 137/883 X |

* cited by examiner

Primary Examiner—Kevin Lee
(74) Attorney, Agent, or Firm—Jackson Walker LLP

(57) ABSTRACT

A device for regulating gas pressure comprising a regulator body, the regulator body having walls defining a single high pressure inlet port and walls defining at least two regulated ports. The regulator body further comprising a high pressure manifold for providing gas to the regulated ports at the pressure it is received at from the high pressure port. The outlet pressure at the regulated ports is independently regulated.

16 Claims, 12 Drawing Sheets

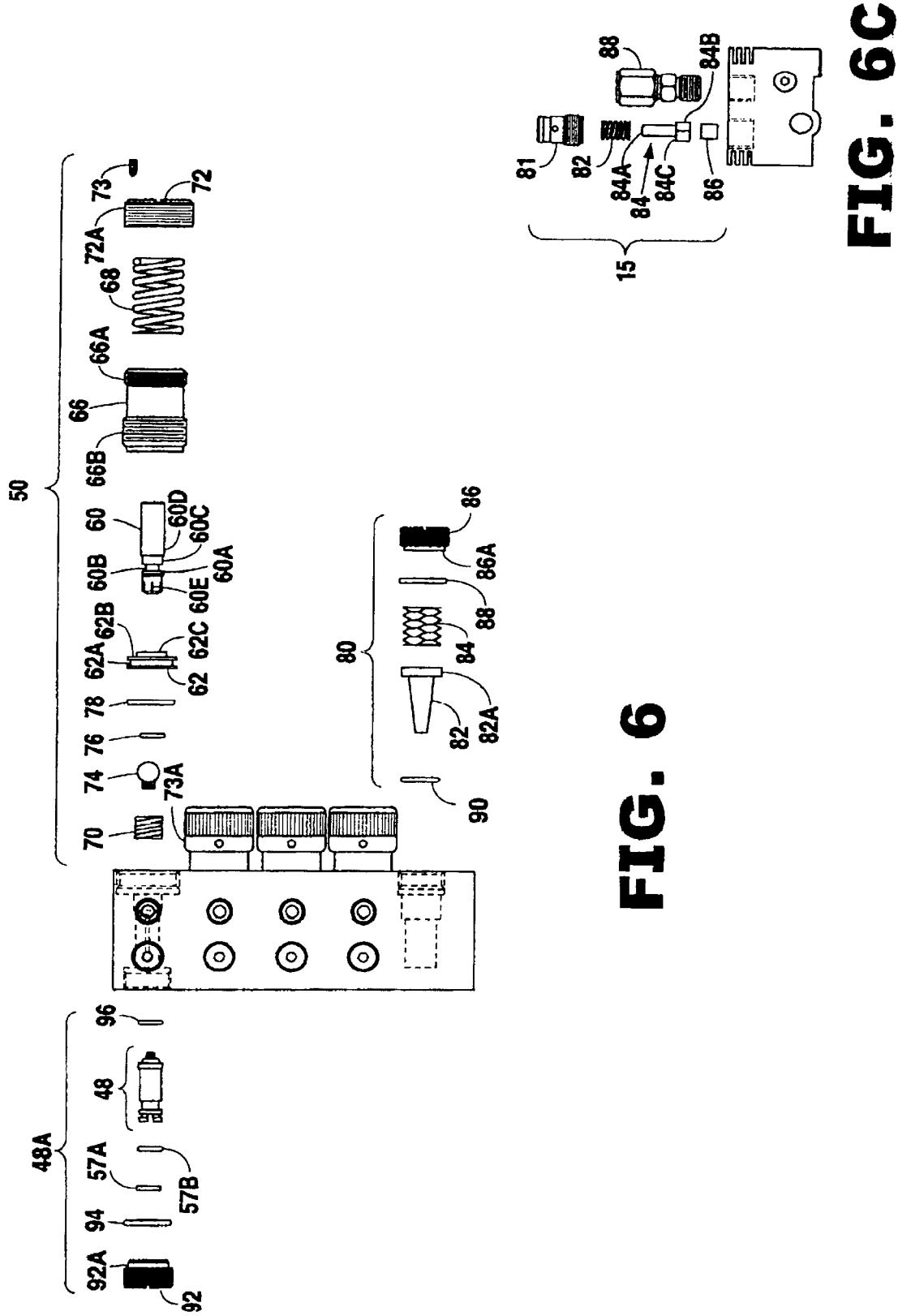

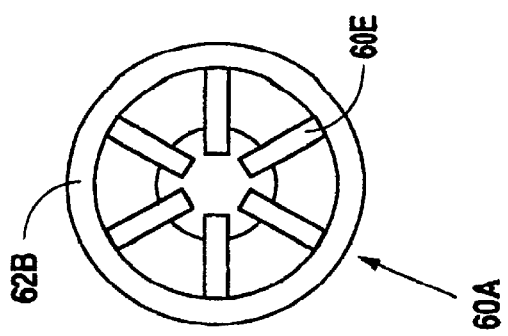
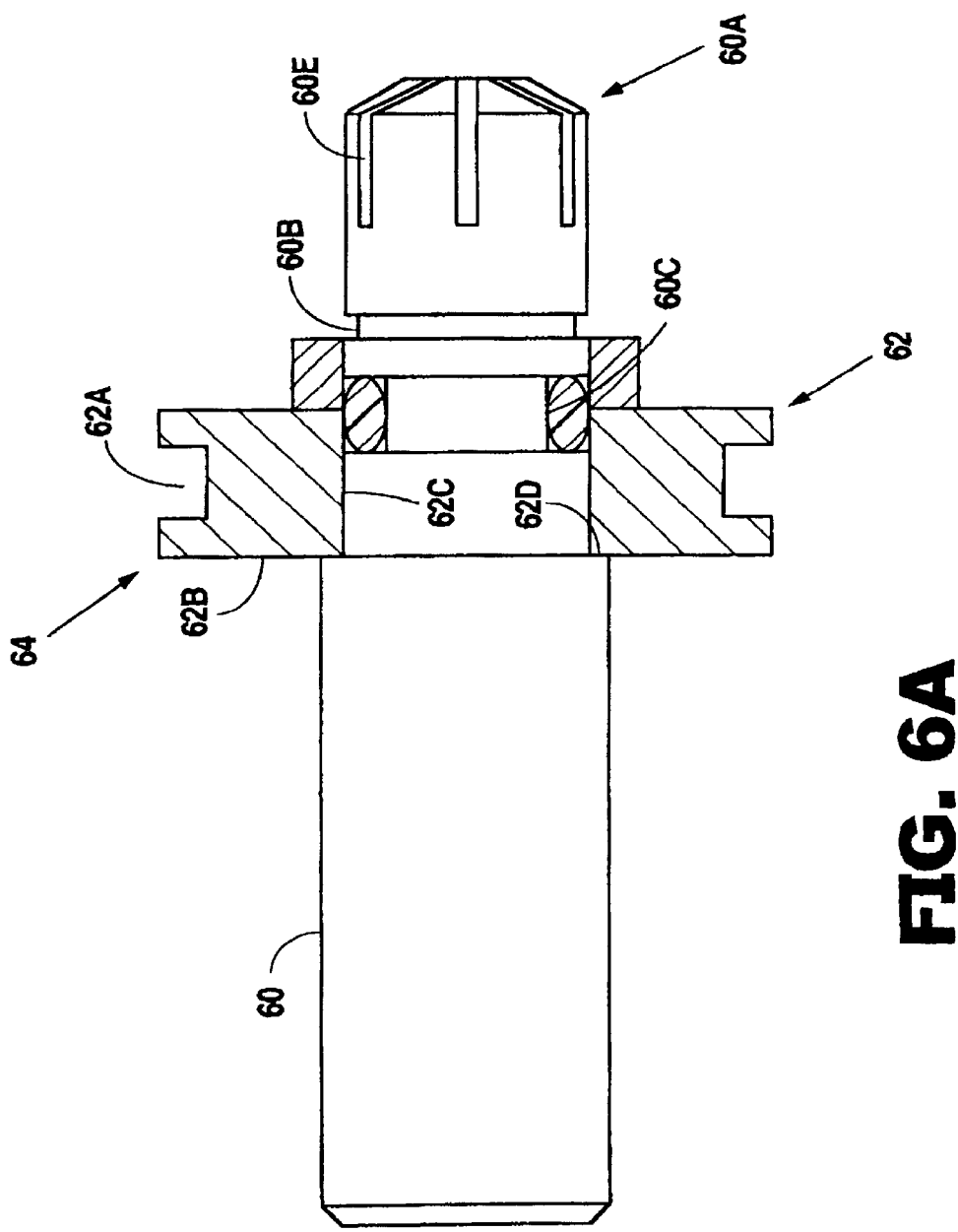

GAS REGULATOR WITH MULTIPLE REGULATED OUTLET PORTS

FIELD OF THE INVENTION

A gas regulator, more specifically a gas regulator having a single high pressure inlet port and multiple independently regulated outlet ports.

BACKGROUND

Most prior art regulators include a regulator body having a single high pressure source port and a single regulated outlet port. However, Applicant has found utility in providing a gas regulator including a regulator body, the gas regulator and regulator body having a single high pressure inlet (source) port and a multiplicity of independently regulated outlet ports. This is especially helpful in beverage dispensing. Gas pressure is often required to carbonate the beverage or to dispense the beverage. For example, it is now common practice to dispense several different kinds of soda from single, hand held, moveable dispensing member. This dispensing member will have several buttons on the head thereof so a bartender may push one button to dispense soda into one glass, push a second button to dispense fruit juice, a third button to dispense beer, etc. Typically, soda requires carbonation (about 45 p.s.i.) Fruit juice requires only driving pressure (about 25 p.s.i.) and beer is driven at aoubt 12 p.s.i. Prior art would supply three separate systems for this application. Presently, each container has its own regulator and gas supply tubes, etc. In a bar or restaurant, all these separate regulators and tubes may not be problem but in some applications simplicity, light weight and compact design is indicated.

Such a gas regulator can find utility in an number applications. A suitable application for Applicant's multi-regulator body is one where lightweight and compact construction is required. Clearly, anything going on an airplane should be light as possible. For example, a beverage cart that must be used in vehicles, such as airplanes, should be compact and lightweight (for being wheeled down a narrow aisle in a passenger airplane).

Turning now to the wheeled beverage cart. It is known that beverage dispenser systems may use a high pressure regulated gas source to dispense the beverage by mixing the beverage with the gas under pressure and dispensing it. For adapting such a dispenser to a small lightweight wheeled cart, it is advantageous to reduce the size of the regulator and the hoses tubes and other equipment associated with a multiplicity of independent regulators. Applicant has provided for such a device in a regulator with a regulator body, with the regulator body including walls defining a single high pressure inlet (source) port and walls defining a multiplicity of independently controlled outlet ports.

Applicant has found further utility and novelty in providing, in such a regulator body, walls defining poppet cartridge chambers (one per outlet port) and in providing a unique single piece cartridge for engaging the walls of the poppet chamber, the poppet cartridges for regulating the passage of gas between the high pressure source port and the regulated outlet port.

Applicant has found further utility and novelty in providing a replaceable gas filter for serial engagement between the high pressure source or inlet port and the independently regulated outlet ports of the regulator body.

Applicant has found yet further utility and novelty in providing for a novel regulator body with means for passive heat transfer, for example by machining cooling fins into the regulator body.

Applicant has found still a further utility in providing for mounting the unique regulator to a wheeled cart.

Applicant has found yet additional utility in providing a unique regulator body with a single high pressure source port and multiple independently regulated outlet ports by further providing for at least a pair of oppositely arranged springs to control the control of the flow of gas through the outlet port.

Last, applicant has found utility in providing a regulator body for a piston regulator wherein the walls of the body are not used to support any portion or other reciprocating mass. This means that the regulation is easier to rebuild.

SUMMARY OF THE INVENTION

This and other objects are provided for in a device for regulating gas pressure. The device includes a typically rectangular, regulator body having a single high pressure inlet port and at least two independently regulated outlet ports. The device can be mounted to a wheeled cart and provide, through its multiple independently regulated outlet ports a single high pressure source to provide for a multiplicity of uses, including dispensing beverages or other fluids.

The device can also be provided with a poppet valve cartridge for insertion into a poppet valve cartridge chamber through which the regulated gas will pass on its way to the regulated port.

The device includes piston and poppet value assemblies that engage the regulator body so that the regulator body does not support the reciprocating masses of these assemblies.

The device may include heat transfer means such fins on the regulated body, the fins increasing the air/body interface and thereby increasing conductive, convective and radiative heat transfer.

Applicant's invention is also seen to comprise a gas filter for filtering the gas before it reaches the independently regulated outlet ports.

BRIEF DESCRIPTION OF THE DRAWINGS

FIG. 6 is an exploded side elevational view of most components of applicant's invention.

FIG. 6A shows side and front (or end) elevational views of the piston body of applicant's invention, illustrating how the piston body is comprised of inner body portion and an outer body portion.

FIG. 6B is an end view of the head of the inner piston body assembly.

FIG. 6C is an exploded end elevational view of the regulator body showing the safety release assembly and a coupling for an outlet port.

DETAILED DESCRIPTION OF THE PREFERRED EMBODIMENT

Figure 1:
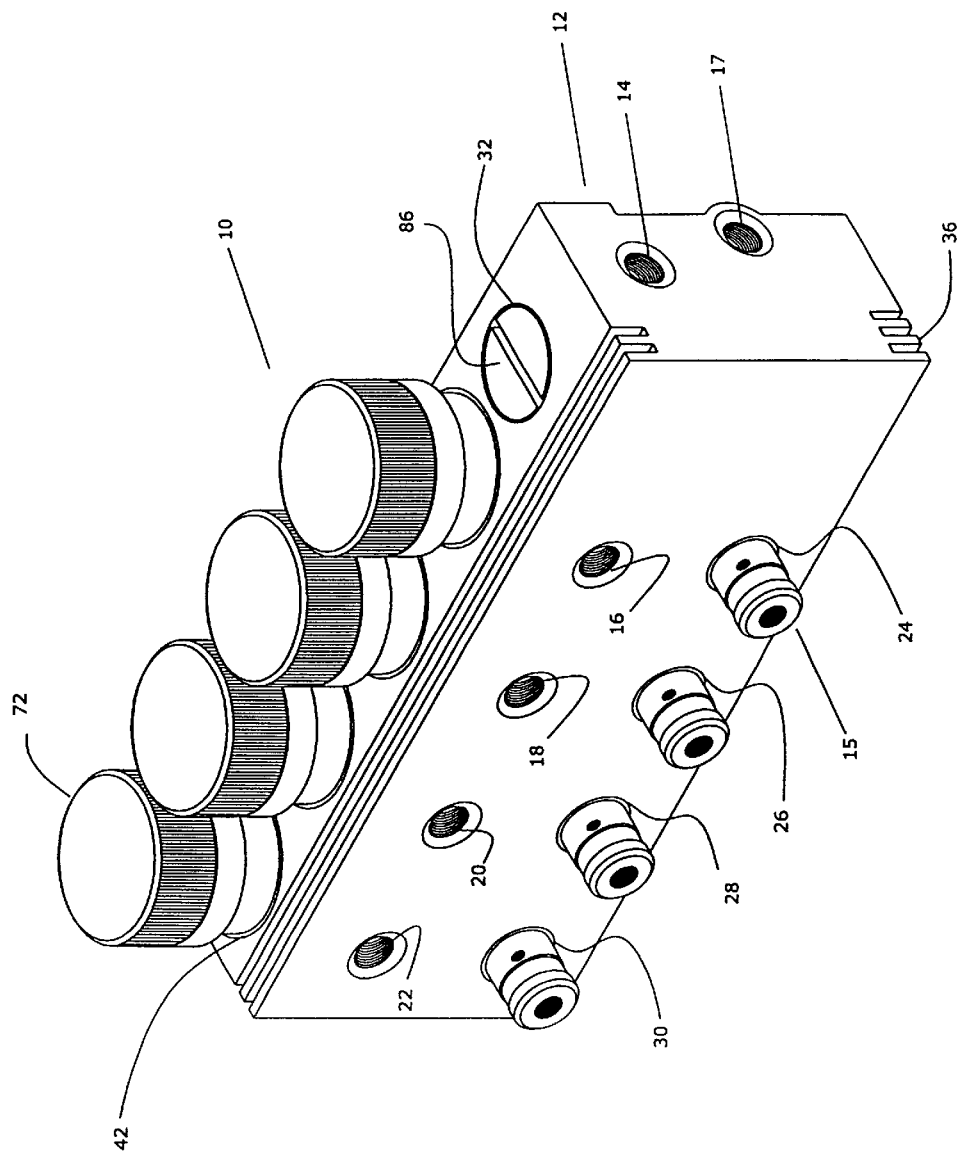
FIG. 1 is a perspective exterior view of applicants gas regulator.

FIG. 1 is an external view of applicants unique gas regulator 10 and FIGS. 2, 2A, 2B, 2C and 3 all illustrate details of Applicant's gas regulator body 12. More specifically, with reference to the figures, gas regulator 10 is seen to include a generally rectangular, typically aluminum regulator body 12. The regulator body has an inlet port 14 for engagement with a high pressure gas source (not shown). Applicant's novel regulator body has multiple, regulated outlet ports 16, 18, 20 and 22 (here four are illustrated but there may be two or more). As will be seen in more detail below these outlet ports are all in gas communication with the same single inlet port 14.

Applicant's novel regulator body 12 also includes safety release valve ports 24, 26, 28 and 30, for engagement with safety release assemblies 15 (see FIG. 6C) involving excessive gas pressure at outlet ports 16, 18, 20 and 22 respectively.

A novel feature of Applicant's regulator body 12 is a filter cartridge chamber 32 (see FIG. 2C) which is capped by a filter cartridge plug 86. The filter cartridge chamber 32 will provide for receipt of means in series with the inlet port 14 through which high pressure gas will be filtered as set forth in more detail.

Applicants regulator body 12 is seen to provide fluid communication for passage of gas through inlet port 14, through filter cartridge chamber 32 and into the a high pressure manifold 34, typically, as shown here, integral with the regulator body. High pressure manifold 34 is in communication with walls defining a poppet valve chamber 40. That is, high pressure manifold 34 picks up the gas from filter cartridge chamber 32 at manifold inlet chamber 34B (see FIG. 2) and transfers the gas at inlet valve pressure, to the multiplicity of poppet valve chambers 40 (here four) through poppet valve chamber inlet ports 34A (here four). Each of the independently regulated outlet ports 16, 18, 20 and 22 have an associated valve chamber regulated port 38, the regulated port 38 between the poppet valve chamber and a regulated inner piston chamber 42C to regulate gas pressure at the outlet ports through interaction of regulated port control means as set forth in more detail below.

One or more safety pressure relief ports may be provided on either the high side (port 17, see FIG. 1) or the low sides.

Figure 2:
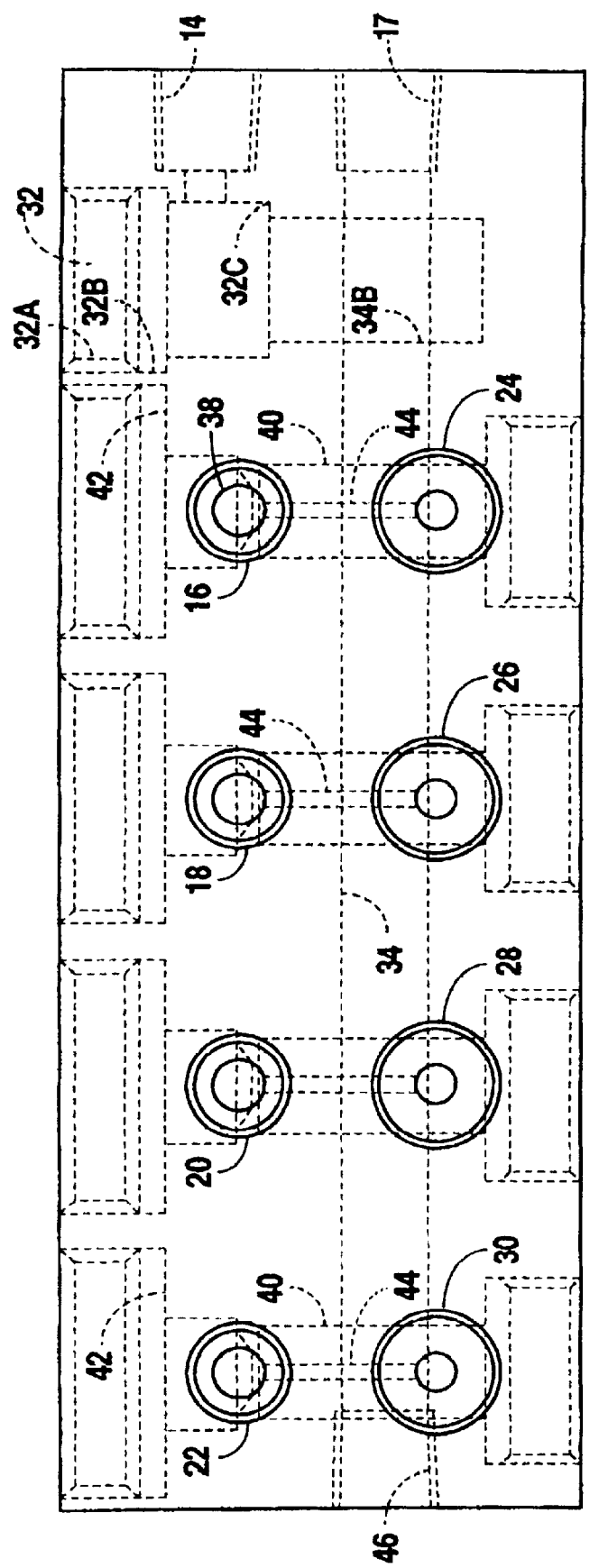
FIG. 2 is an exterior side elevational view of the regulator body with the outlet ports and safety release ports visible.
Figure 2A:
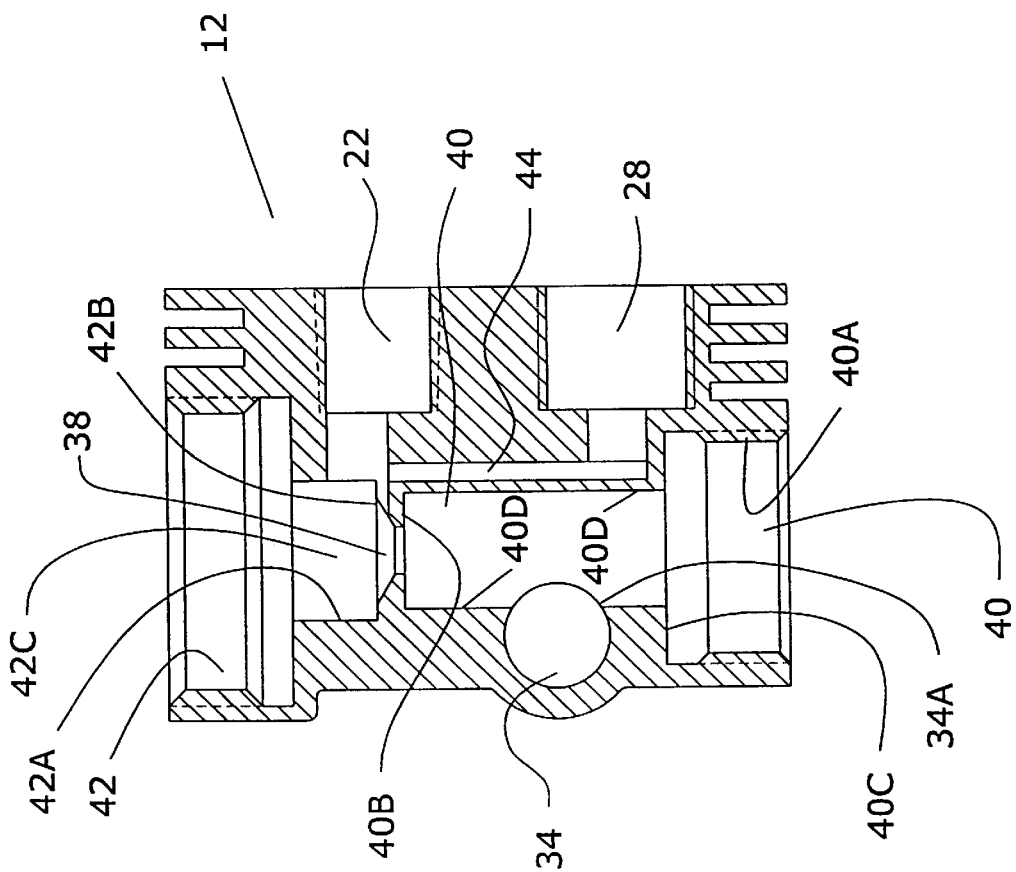
FIGS. 2A and 2B are cross-sectional cutaway end elevations of the regulator body apart from the rest of the parts of applicants apparatus, through two of the independently regulated outlet ports 18 (FIG. 2B) and 22 (FIG. 2A).
Figure 2B:
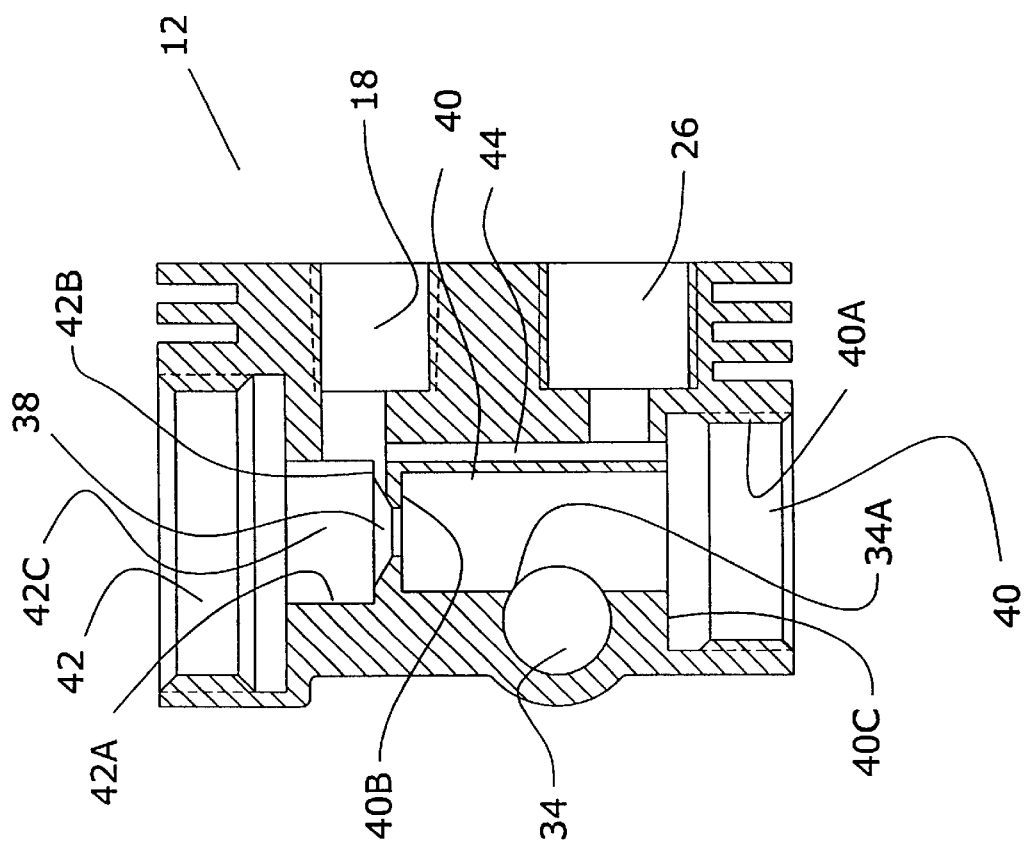

At the low sides it is seen, with reference to the figures, that each of the safety release valve ports 24, 26, 28 and 30 is in communication with the outlet port through a relief port connecting passage 44 (See FIGS. 2, 2A and 2B). With this port Applicant's provide safety valve mechanisms 15 for control of overpressurization at the outlet port. In addition, Applicant's provide a test point coupling port 46 with which Applicant's may test pressure in the high pressure manifold 34.

Turning now to FIGS. 4A, 4B, 5, 5A, 5B and 6 it is seen that Applicant also provides a poppet valve assembly 48 and a piston assembly 50, as means to regulate gas at the outlet ports. The poppet valve assembly is dimensioned for receipt into poppet valve chamber 40 and piston assembly 50 is dimensioned for receipt into piston chamber 42. The details of Applicant's poppet valve assembly and poppet valve body are set forth in more detail below.

An understanding of regulator body 12 as set forth above will help understand addition features of Applicants invention. FIGS. 4A, 4B, 5, 5A and 5B and 6 illustrate, respectively, poppet valve cartridge assembly 48, poppet valve chamber assembly 48A and piston assembly 50. At the outset, it is to be understood that poppet valve cartridge assembly 48 is received at least partially, into poppet valve chamber 40 and piston assembly 50 is designed for receipt at least partially within inner piston chamber 42C. The poppet valve and piston act against each other to regulate gas flow through regulated port 38 in a manner set forth below.

Figure 4A:
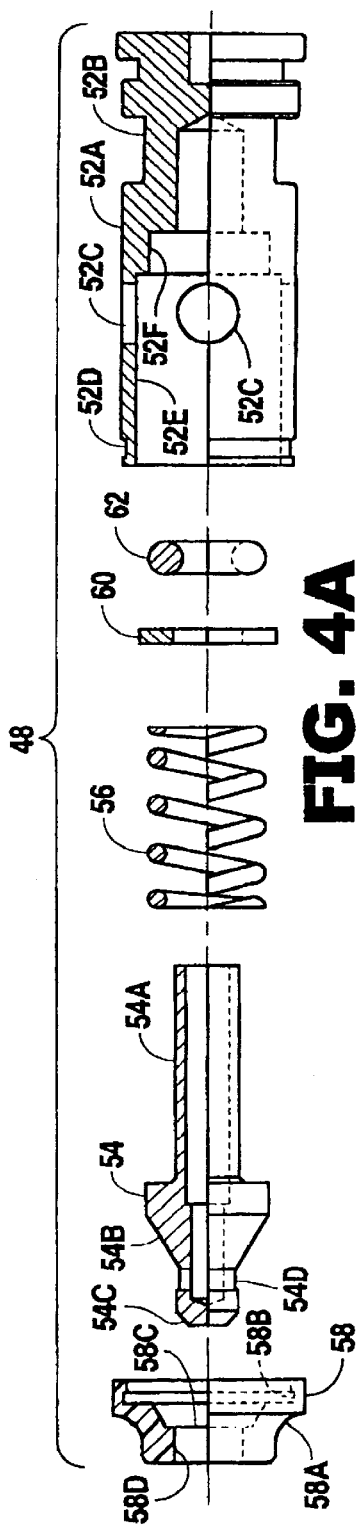
FIG. 4A is an exploded view in side elevation, partially cut away, of the poppet valve assembly of applicants invention.
Figure 4B:
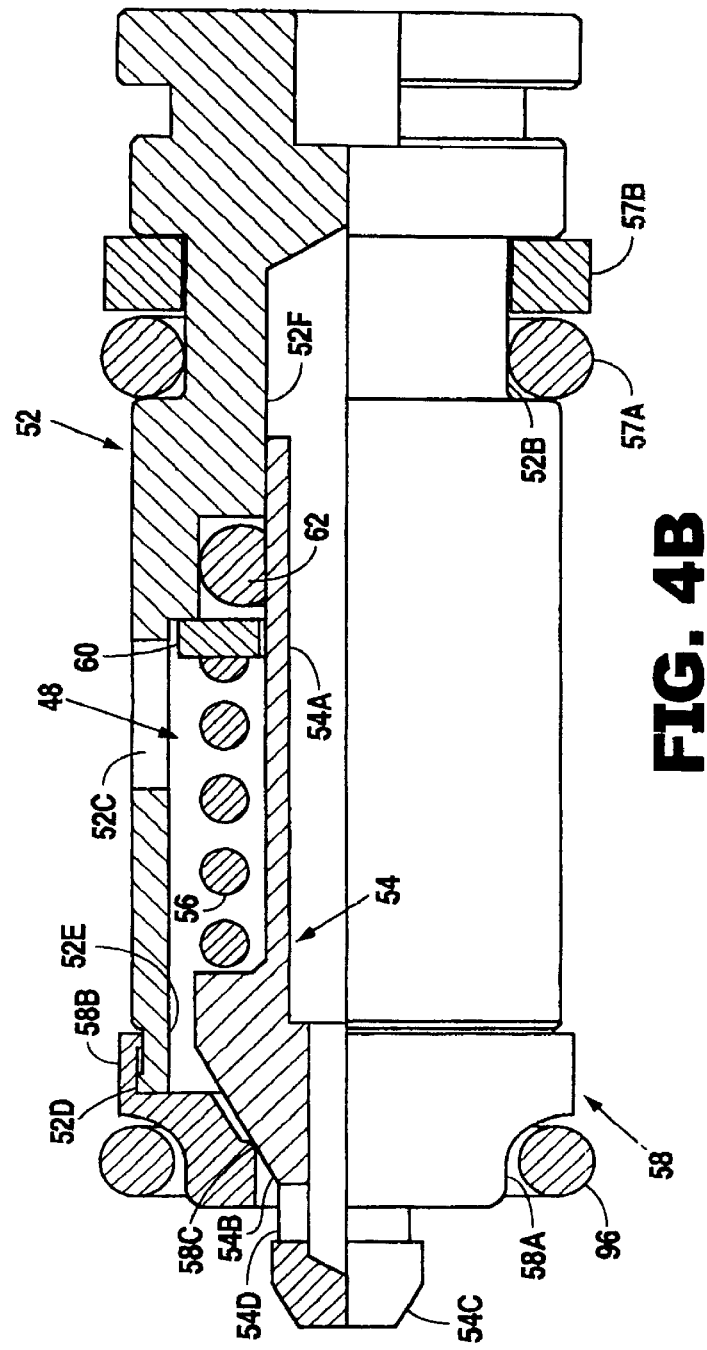
FIG. 4B is a side elevational (partially cut away) of part of the poppet valve assembly.

Turning to FIGS. 4A and 4B Applicant will discuss the details of poppet valve cartridge assembly 48. Poppet valve cartridge assembly is comprised of four main parts: poppet valve body 52, poppet valve 54, poppet valve spring 56 and poppet valve seat 58. Poppet valve body 52 is a single piece that has walls 52A that include walls defining "O" ring bay 52B, ports 52C (typically 4 arranged equidistant around the body forward of bay 52B), lip 52D, poppet valve spring chamber 52E, and poppet valve guide walls 52F. Poppet valve 54 is also seen to be a single piece and includes poppet valve guide member 54A, seat engagement portion 54B and head 54C. Poppet valve spring 56 is seen to be dimensioned for receiving poppet valve guide member 54A within the coils thereof and for receipt into poppet valve spring chamber 52E as is apparent from FIG. 4B. Seat 58 is also a single member which includes "O" ring engagement portion 58A, lip receiving portion 58B, poppet valve seat engagement portion 58C and head cutout 58D for receipt of poppet valve head 54C therethrough. The remaining parts of poppet valve cartridge assembly 48 are seen in FIGS. 4a and 4b to consist of spring retainer plate 60 and "O" ring 62.

Details of the piston assembly 60 follow, with reference to FIGS. 1, 5, 5A 6, 6A and 6B. Piston assembly 50 is seen to have a piston body 64 which is typically made up of two portions: an inner piston body portion 60 and an outer piston body portion 62, which cooperate with one another as is set forth more fully below. Inner piston body portion 60 includes a head 60A, retainer ring groove 60B, "O" ring groove 60C and outer body portion engagement shoulder 60D. Head 60A includes grooves 60E (see FIGS. 6A and 6B) which will assist gas flow into inner piston chamber 42C. Outer piston body portion 62 includes "O" ring groove 62A, outer spring engagement walls 62B and inner body portion retainer walls 62C. Retainer ring 74 cooperates with groove 60D to hold outer piston body portion 62 against engagement shoulder 60D so the two piston body portions function as one (see FIG. 5).

Figure 2C:
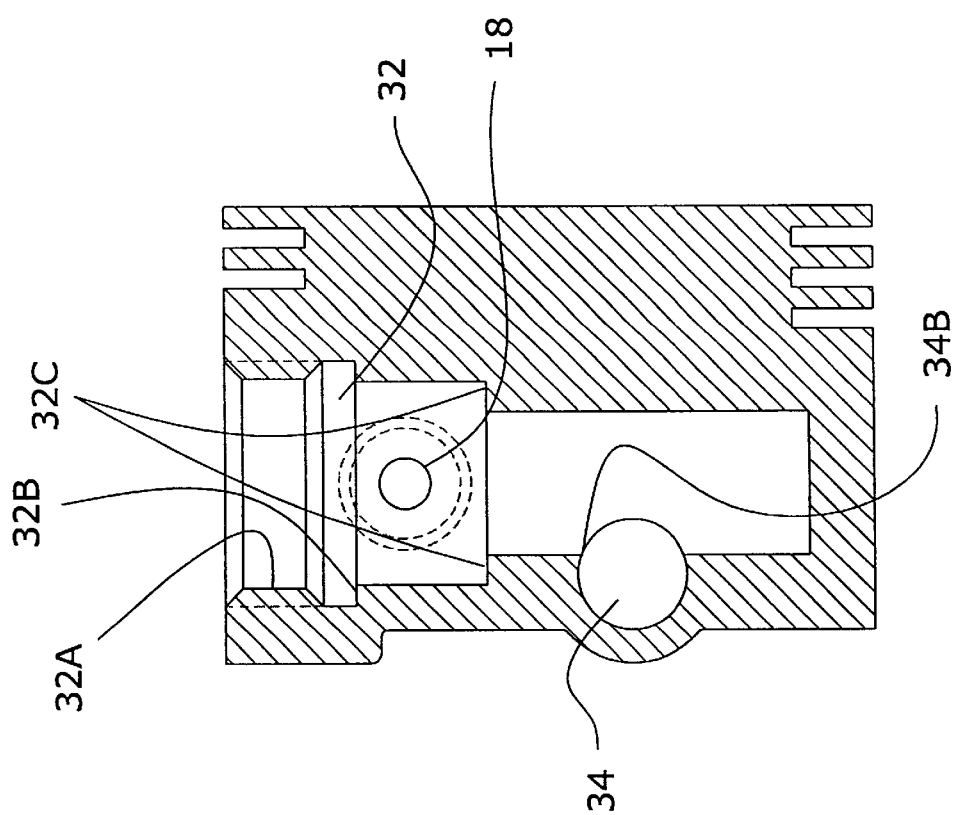
FIG. 2C is a cross-sectional end elevation of the regulator body alone, through the inlet port.
Figure 3:
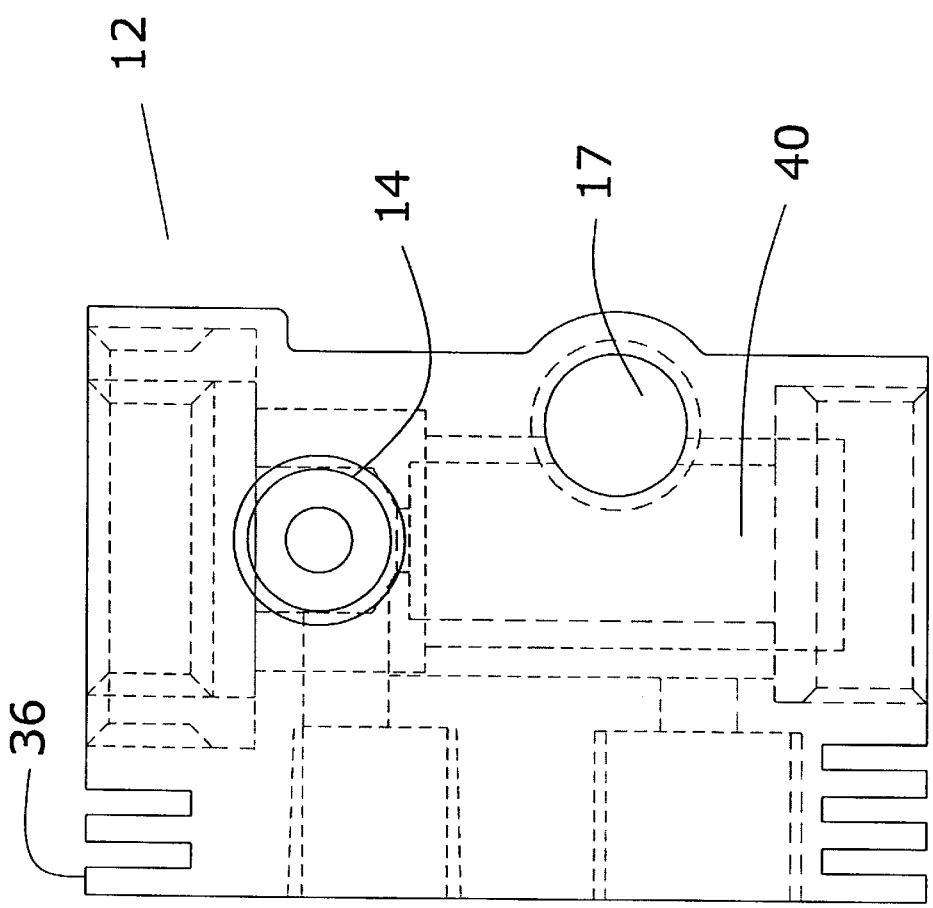
FIG. 3 is an end view in elevation of the inlet port end of the regulator body.

Piston assembly 50 also includes outer spring chamber housing 66 having a rearward threaded portion 66A and a forward threaded portion 66B for engagement with the threaded walls of outer piston chamber 42 of regulator body 12 (See FIGS. 2B and 2C). Cap 72 threads onto threaded portion 66A, and also includes inner piston body portion engagement walls 72A for engagement with piston body 64 (See FIG. 5).

Figure 5:
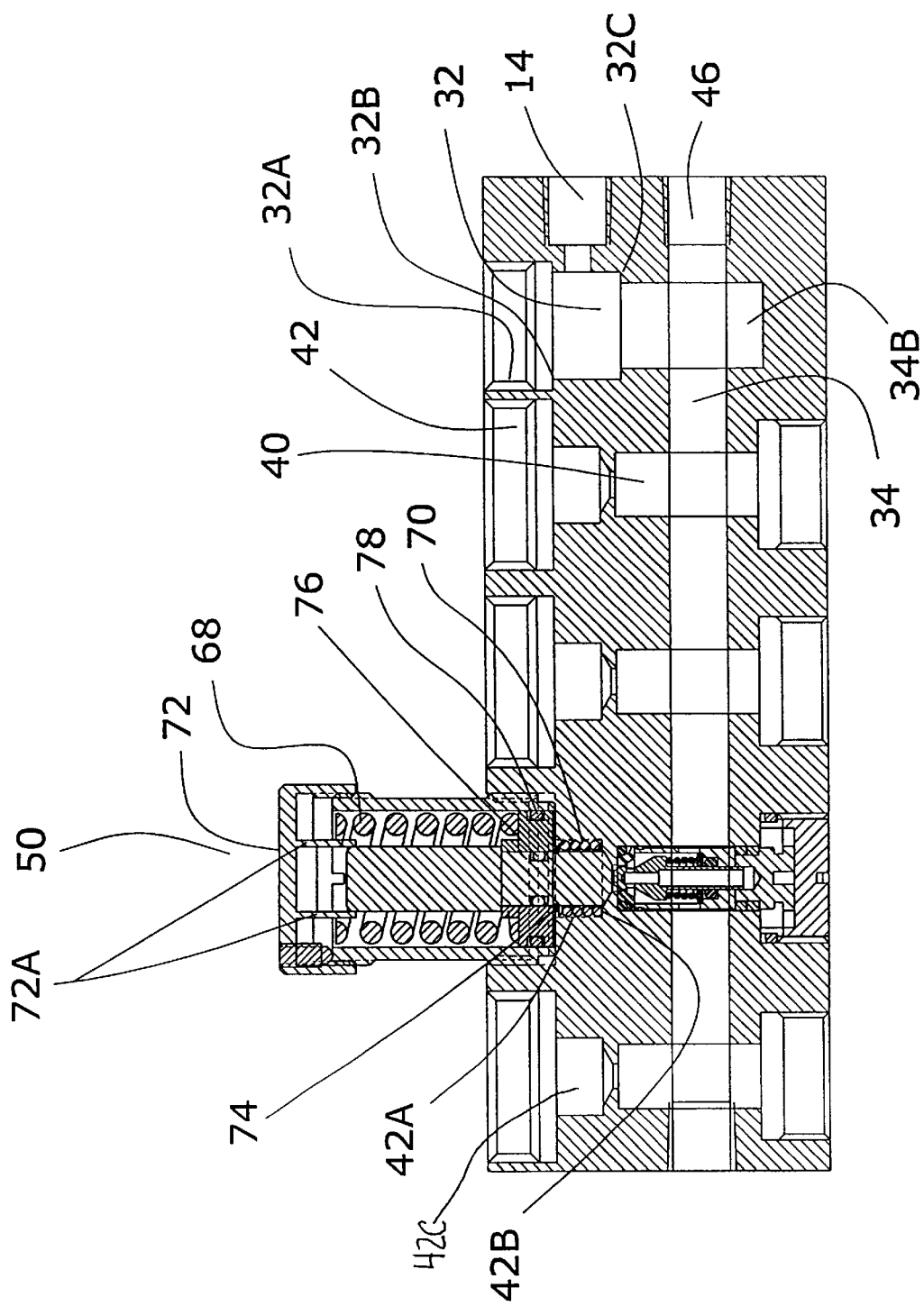
FIG. 5 is a top elevational, showing the regulator body in cross section.
Figure 5A:
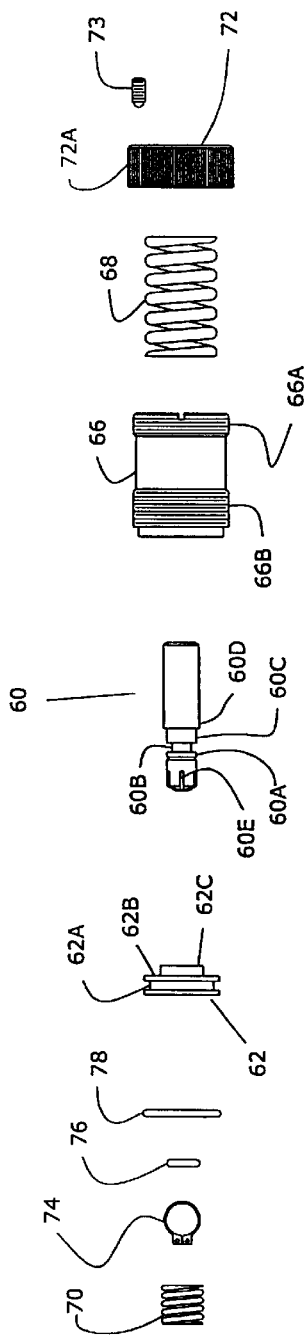
FIGS. 5A and 5B illustrate exploded side elevational views of the poppet valve chamber assembly and the piston assembly.
Figure 5B:
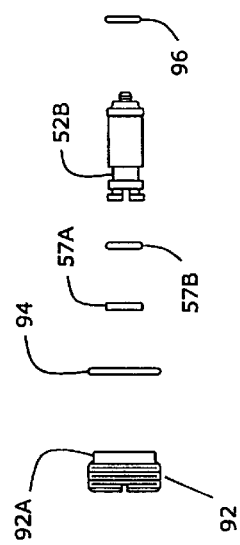

Spring 70 will fit snugly within walls 42A of inner piston chamber 42C. Spring 68 will fit snugly within outer spring chamber housing 66 as illustrated in FIG. 5. Thus, as seen in FIGS. 5 and 6 piston assembly 50 discloses an inner spring acting at a forward end against walls 42B of inner piston chamber 42C and at the opposite end acting against piston body 64 urging it out of regulated part 38. Outer spring 68 works against piston body 64 to urge it towards regulated port 38. Moreover, outer spring 68 can be adjusted to increase pressure on the piston body 64 towards regulated port 38 by threading in cap 72.

When the proper pressure is reached, cap set screw 73 is rotated into a threaded bore in the sidewalls 72A of the cap to seat against walls of outer spring chamber 66. In the alternative, a lock ring 73A may be used. Either way, means are provided to prevent the cap from backing out.

FIGS. 2, 2C and 6 provide details of the structure and function of a gas filtering assembly 80 which is designed to fit into filter cartridge chamber 32. Gas filter assembly 80 includes a cylindrical bronze filtering element 82 having an annular ring 82A against which spring 84 acts. Threaded plug 86 is designed to engage threaded walls 32A of filter cartridge chamber 32 and includes walls 86A which will seat "O" ring sealing means 88 against shoulder 32B of filter cartridge chamber 32 and also will urge spring 84 against ring 82A. This will push ring 82A against "O" ring 90 and ring 90 against shoulder 32C of filter cartridge chamber 32. As seen in FIGS. 2, 2C and 6, the design of filter cartridge chamber 32 and gas filter assembly 80, with "O" rings 88 and 80 seated as shown will allow gas from the high pressure source to flow through element 82. The element may be removed for cleaning or replacement by unthreading cap 86. Note that by providing a separate chamber for a gas filtering assembly that is between the manifold and the inlet port, inherent in the structure of applicants gas filtering assembly 80 is the ability to remove the filter element without disturbing any other part of the device.

FIGS. 2, 2A, 2B and 6 also illustrate the manner in which poppet valve cartridge assembly 48A is engaged with regulator body 12 and piston assembly 50. More specifically, FIG. 6 illustrates threaded plug 92 having walls 92A (for receipt of "O" ring 94), threaded plug 92 with threaded walls for engaging threaded walls 40A of poppet valve cartridge chamber 40. "O" ring 94 is compressed against walls 40C of poppet valve cartridge chamber 40. "O" ring 96 is designed to act between walls 58A of poppet valve seat 58 and poppet valve cartridge chamber walls 40B (See FIG. 2B). A pair of "O" rings 57A and 57B will fit in bay 52B (See FIG. 4B) to insure a gas tight seal between poppet valve cartridge 48 and walls 40D of poppet valve cartridge chamber 40. Note that the poppet valve slides back and forth on the poppet valve body, not on wall of the regulator body itself.

Applicants use of a poppet valve assembly 48, which includes dynamic balancing port 54D in poppet valve 54 reduces tension on spring 56. It is seen with reference, for example, to FIG. 5 that gas from inlet port 14 will pass into the poppet valve chamber and into the interior of poppet valve body 52 where it will, when walls 54B separate from walls 58C of poppet valve seat 58, allow gas to pass through the regulated port 38 and out the outlet port. By providing balancing port 54D, pressure on spring 56 is reduced by the pressure in the inner piston chamber.

Assembly of regulator 10 includes engagement of regulator body 10 with poppet valve chamber assembly 48A. Piston assembly 50 is then engaged longitudinally with piston chamber 42. This is done with all of the independently regulated ports.

When threaded cap 72 is threaded onto the outer spring housing 62 it will urge together head 54C of poppet valve cartridge assembly and head 60A of piston body 64, loading spring 56 and "assisting" spring 70 in biasing against spring 68. By providing a threaded cap on the end of the common longitudinal axis to both piston and poppet valve cartridge assembly chambers and through the regulated port, Applicant has provided means to adjustably set a cut off pressure. This cut off pressure is preferably adjusted to be within the mid-range of deflection (20%–70%) of spring 68. This typically provides for more linear response to pressure changes against the spring.

Applicant provides for the independent regulation of 2 or more outlet ports (here four). For example, if outlet ports 16, 18, 20 and 22 require 60, 80, 100 and 150 psi cutoff pressure respectively, inlet port 14 may be engaged with a 2000 psi source and each of the caps 72 may be independently adjusted by backing out cap 70 to decrease cutoff pressure at the regulated port or threading it inward to increase cutoff pressure. That is, each cap may be adjusted for that particular outlets ports desired pressure setting.

Finally, note that neither the poppet valve nor the piston body, nor indeed, any reciprocating mass, uses the regulator body for frictional support. That is, none of the walls of the regulator body are subject to shear forces of a reciprocating piston, as is normal in a piston regulator. Thus, Applicants unique regulator body is not subject to as much wear and is easier to rebuild.

Figure 8:
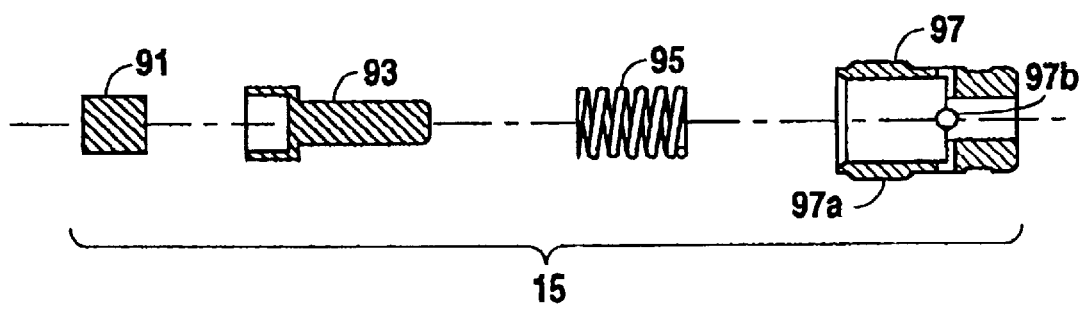
FIG. 8 is an exploded side elevational view of the safety release assembly.

FIG. 8 illustrate details of Applicants safety release assembly 15, including seat 91, stem 93, spring 95 and housing 97 with threaded portion 97A and release port 97B. Threaded portion 97A will engage walls in the safety release port 24, 26, 28 and 30 and seat 91 will seat against the port opening.

Figure 7:
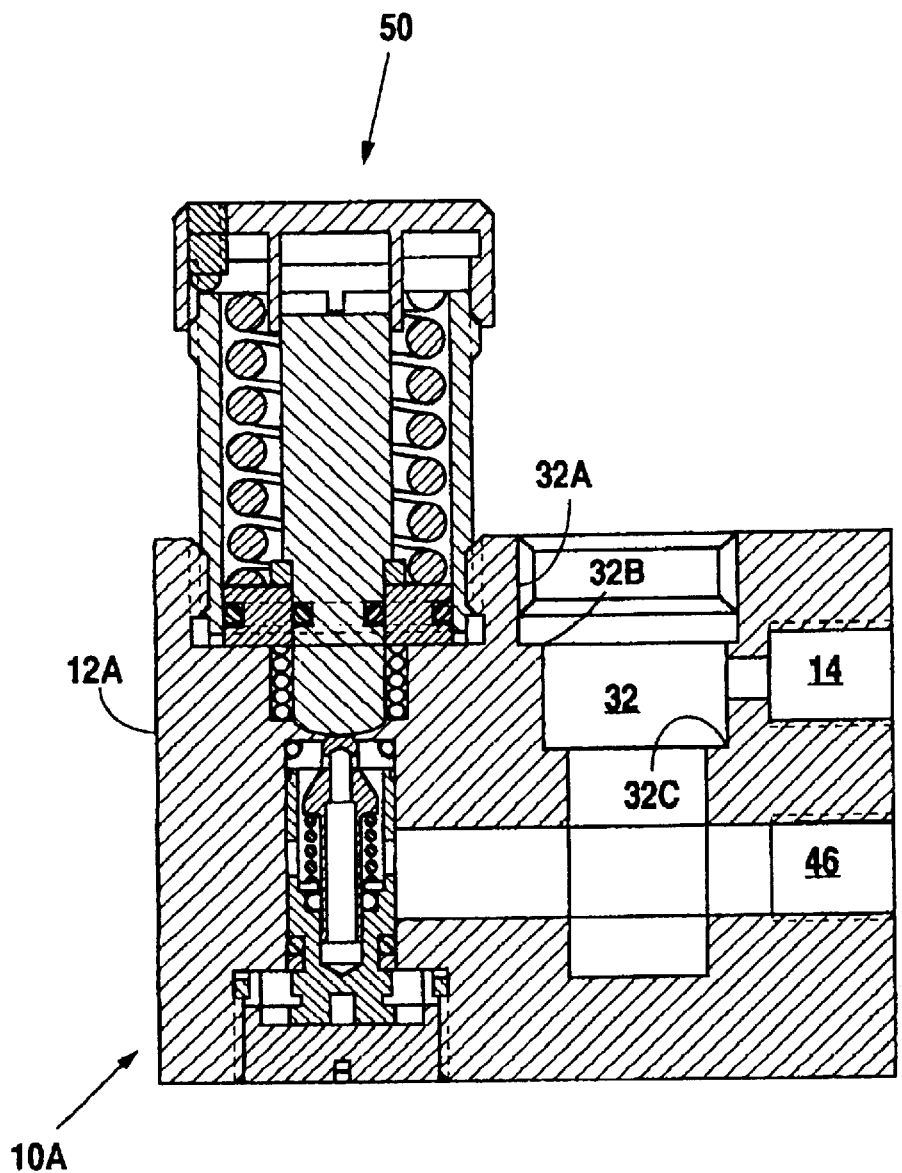
FIG. 7 is an alternate invention having a single regulated port having many of the same features of the multiregulated port.

While Applicant discloses many unique features in association with a multiregulator body, it is noted that several of Applicants features are also unique to regulators with a single inlet and single regulated outlet port. FIG. 7 shows a regulator 10A body 12 with a single regulated outlet port. As with the multiregulator body, it is seen that Applicants provide a unique poppet valve cartridge, gas filter assembly, grooves 60E (See FIGS. 6A and 6B) and means to regulate the outlet port wherein neither the poppet valve nor the piston bear shear forces on the regulator body. A cutaway end view would look like 2A. An exploded view would look like the last port in FIG. 6. In other words, many of the features found in Applicants multiregulator invention are unique to single regulated bodies.

We claim:

1. A device for regulating gas pressure, the device comprising:
    a regulator body, the regulator body having walls defining a single high pressure inlet port and walls defining at least two regulated ports, the body further comprising a high pressure manifold for providing gas to the regulated ports at the pressure it is received at from the high pressure port: and,
    regulating means engageable with the regulated ports and the regulator body for independently regulating outlet pressure at the regulated ports.

2. The device of claim 1 further including a wheeled cart, the wheeled cart including means to mount the regulator body thereto.

3. The device of claim 1 wherein the regulator body walls defining at least two outlet ports includes walls defining a poppet cartridge chamber.

4. The device of claim 3 wherein regulating means includes a poppet cartridge for engagement with the walls defining the poppet cartridge chamber.

5. The device of claim 1 further including walls defining a gas filter chamber in series with the single high pressure inlet port.

6. The device of claim 1 wherein the regulator body includes heat transfer fins.

7. The device of claim 5 further including a gas filter for engagement with the walls defining the gas filter chamber.

8. The device of claim 1 further including walls defining a test point coupling port for cooperating with a test instrument to test pressure in the manifold.

9. The device of claim 1 further including an adjustably settable lock screw in cooperation with the means to independently regulate.

10. The device of claim 1 wherein the regulator body include walls defining at least one safety pressure release port.

11. The device of claim 10 further including a safety pressure release assembly for cooperation with the at least one safety pressure release port.

12. The device of claim 7 wherein the gas filter is replaceable without effecting or disassembling any other parts of the device.

13. The device of claim 7 wherein the gas filter is made from scintered stainless steel or bronze.

14. The device of claim 1 further including means to regulate pressure at the regulated ports and wherein means to regulate pressure at the regulated ports does not use the regulator body walls to support reciprocating motion as a sheer surface.

15. The device of claim 1 wherein the means for independently regulating the outlet pressure includes a poppet valve assembly engaged with a piston.

16. The device of claim 15 wherein the piston includes a piston housing, the piston housing having threaded walls engageable with the regulator body.

* * * * *